April 19, 1960   C. P. HOFFMAN   2,933,700
APPARATUS FOR ELIMINATING SECOND TIME AROUND ECHOS
Filed Sept. 19, 1958
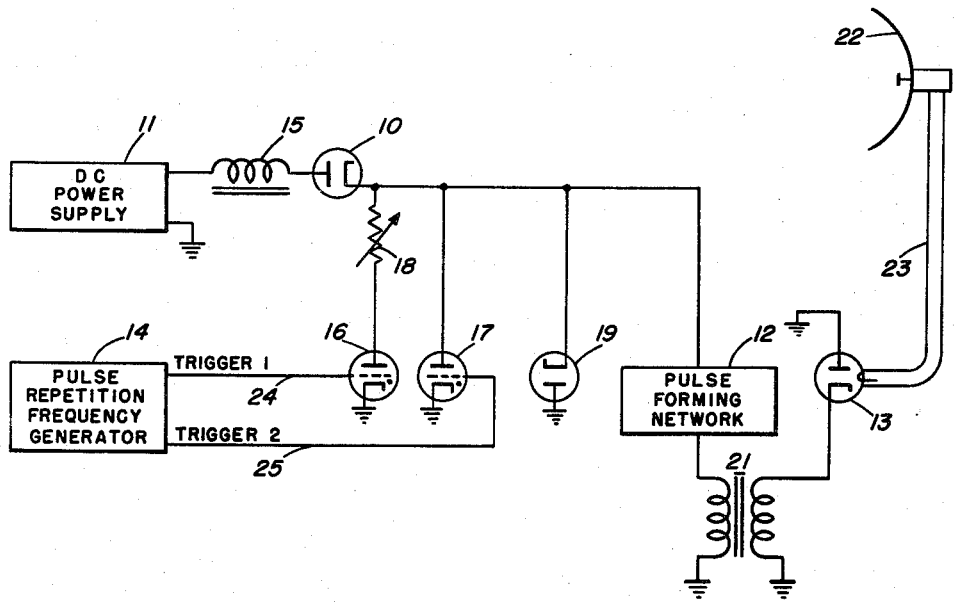
INVENTOR
CHARLES P. HOFFMAN
BY
ATTORNEY

United States Patent Office 2,933,700
Patented Apr. 19, 1960

2,933,700

APPARATUS FOR ELIMINATING SECOND TIME AROUND ECHOS

Charles P. Hoffman, Severna Park, Md., assignor, by mesne assignments, to the United States of America as represented by the Secretary of the Navy Application September 19, 1958, Serial No. 762,191

4 Claims. (Cl. 332—5)

The present invention relates to apparatus for eliminating second time around echos in radar systems and more particularly to apparatus for eliminating second time around echos which utilizes magnetron pushing.

Second time around echos are returns from a target at a range greater than the range of the radar at the pulse repetition frequency in use. Second time around echos are a serious problem with airborne radar as they tend to obscure desired targets and adversely affect the tracking circuits of fire control systems. Second time around echos increase with altitude and pulse repetition frequency. As the modern plane tends to fly higher and tracking circuits perform better at higher pulse repetition frequencies the problem is intensified.

The most common solution to the second time around echos problem has been to jitter the pulse repetition rate or to lower the pulse repetition frequency. Jittering the pulse repetition rate does not eliminate second time around echos but tends to smear the presentation of false target returns on the indicator. The presentation of true target returns is undistorted. While an operator can distinguish between true and false target returns, automatic tracking circuits cannot so distinguish. Lowering the pulse repetition frequency does eliminate second time around echos but it reduces definition and adversely affects range tracking.

The present invention eliminates second time around echos by changing the frequency of consecutive transmitted pulses. This is accomplished by magnetron pushing which can be defined as the rate of change of the magnetron frequency as the magnetron current is varied with constant magnetic field and load, expressed as megacycles per second per ampere.

Without magnetron pushing, returns from targets large enough in size and far enough in range from a first transmitted pulse would arrive at the receiver during the period directly after a second pulse had been transmitted. It is then not possible to tell which pulse is being reflected.

If the first transmitted pulse was of a different frequency than the second transmitted pulse, then an echo from the first pulse during the period directly after the second pulse has been transmitted could be rejected. The rejection may be accomplished by using an instantaneous automatic frequency control, or one that will correct the frequency of the local oscillator on every transmitted pulse. The automatic frequency control may be of the type shown in U.S. Patent No. 2,469,875 for Automatic Frequency Control for Pulse Transmission Systems issued to G. W. Fyler, May 10, 1949. Use of an instantaneous automatic frequency control will also permit the receiver bandwidth to be narrowed and approach an optimum value for detection.

An example of how second time around echos are eliminated is as follows: A receiver having a bandwidth of 2 megacycles and an intermediate frequency of 30 megacycles is used. A typical magnetron, which may for example have a magnetron pushing figure of one megacycle per second per ampere, is used in the radar transmitter. The magnetron is pulsed alternately with pulses having a 5 ampere difference in amplitude which will give a 5 megacycle difference in the magnetron output pulses. The frequency of the first transmitted pulse is 9000 megacycles and the automatic frequency control will correct to 9030 megacycles. The frequency of the second transmitted pulse is 9005 megacycles and the automatic frequency control will correct to 9035 megacycles. Thus, any return due to a desired target after transmission of the second pulse would be at a frequency of 9005 megacycles and result in an intermediate frequency of 30 megacycles which is desired for the receiver. A target return arriving at the same time due to the first pulse, second time around echo, would be at a frequency of 9000 megacycles resulting in an intermediate frequency of 35 megacycles. This is well out of the 2 megacycle passband of the receiver and would be rejected.

With a narrow receiver bandpass, resulting from the use of an instantaneous automatic frequency control the amount of pushing required would be relatively small to give adequate protection. Therefore, it would be possible to increase the number of different pulse amplitudes used, effectively reducing the repetition rate with respect to second time around echos. It would for example, be possible to operate at a pulse repetition frequency of 2000 pulses per second and program to give four consecutive pulses of different amplitude. This would appear like a pulse repetition frequency of 500 pulses per second with respect to "second time around echos."

An object of the present invention is the provision of a radar system in which second time around echos will be virtually eliminated from the receiver and indicator.

Another object is to provide a radar system which eliminates second time around echos and is adaptable for use with either fixed tuned or tunable magnetrons.

Other objects and many of the attendant advantages of this invention will be readily appreciated as the same becomes better understood by reference to the following detailed description when considered in connection with the accompanying drawing.

The following detailed description relates only to the portions of the radar system described generally above that are not conventional.

Referring now to the drawing there is shown a line-pulsing modulator circuit comprising a charging diode 10, direct current power supply 11, pulse forming network 12, magnetron 13, and pulse repetition frequency generator 14. The anode of charging diode 10 is coupled through charging choke 15 to one side of power supply 11. The other side of power supply 11 is coupled to ground. Thyratrons 16 and 17 are coupled in parallel between the cathode of diode 10 and ground. Resistor 18 is connected in series between the anode of thyratron 16 and the cathode of diode 10. Also coupled between the cathode of diode 10 and ground is shunt diode 19. The output from pulse forming network 12 is coupled to magnetron 13 through pulse transformer 21. Magnetron 13 is coupled to antenna 22 by means of conductor 23.

The control grids of thyratrons 16 and 17 are connected to pulse repetition frequency generator 14 by leads 24 and 25 respectively.

In operation, generator 14 provides alternate trigger pulses 1 and 2 for firing thyratrons 16 and 17 successively. When thyratron 16 is fired by trigger pulse 1, the amplitude of the pulse furnished thereby will be lower than the pulse furnished by thyratron 17 when fired by trigger pulse 2. The pulse furnished by thyratron 16 will cause magnetron 13 to operate at some frequency X, for example. If the pulse repetition frequency were 1,000 pulse per second then trigger pulse 2 would fire thyratron 17 1,000 microseconds later giving a pulse of a slightly higher amplitude than the pulse produced by thyratron 16. Magnetron 13 would then be pulsed at a frequency higher than X depending upon the differences in amplitude of the two pulses. The frequency difference between consecutive magnetron pulses may be varied by adjusting the resistance of resistor 18. The number of triggers and thyratrons may be increased to any desired number. By inserting different values of resistance in series with the thyratron different amplitude pulses may be obtained from each thyratron, thus pulsing the magnetron at different frequencies.

Obviously many modifications and variations of the present invention are possible in the light of the above teachings. It is therefore to be understood that within the scope of the appended claims the invention may be practiced otherwise than as specifically described.

What is claimed is:

1. A line pulsing modulator for use with a radar transmitter system including a magnetron oscillator, said modulator comprising: a charging diode, a direct current power source coupled to said charging diode for supplying energy thereto, first and second switch means coupled to said charging diode, means coupled to said first and second switch means for permitting said charging diode to excite said oscillator with a first pulse of an amplitude at which said oscillator has one frequency of oscillation and a second pulse of an amplitude at which said oscillator has a different frequency of oscillation.

2. The transmitter of claim 1 wherein said first and second switch means are thyratrons.

3. A line pulsing modulator for use with a radar transmitter system including a magnetron oscillator, said modulator comprising: a charging diode, a direct current power source having first and second terminals, said first terminal being coupled to the anode of said charging diode, a transformer coupling the cathode of said charging diode to said oscillator, first and second thyratrons, each having an anode, cathode and control grid, the anode of said first thyratron being connected in series with a resistor to the cathode of said charging diode, the anode of said second thyratron being connected to the cathode of said charging diode, the cathodes of said thyratrons being coupled to the second terminal of said power source, pulse repetition frequency generator means for alternately generating first and second trigger pulses, means coupling said first trigger pulse to the control grid of said first thyratron, and means coupling said second trigger pulse to the control grid of said second thyratron whereby the oscillator will be alternately excited by a first pulse of an amplitude at which the oscillator has one frequency of oscillation and a second pulse of an amplitude at which the oscillator has a different frequency of oscillation.

4. The transmitter of claim 3 wherein said resistor is variable.

References Cited in the file of this patent

UNITED STATES PATENTS

| | | |
|---|---|---|
| 2,433,669 | Keister | Dec. 30, 1947 |
| 2,555,150 | Norton | May 29, 1951 |
| 2,584,509 | Spencer | Feb. 5, 1952 |
| 2,603,752 | Winter | July 15, 1952 |